(12) United States Patent　(10) Patent No.: US 9,227,538 B2
Girbinger et al.　(45) Date of Patent: Jan. 5, 2016

(54) MOTOR-VEHICLE ARMREST

(71) Applicants: Joerg Girbinger, Amberg (DE); Erwin Himmelhuber, Sulzbach-Rosenberg (DE); Gerhard Delling, Schmidgaden (DE)

(72) Inventors: Joerg Girbinger, Amberg (DE); Erwin Himmelhuber, Sulzbach-Rosenberg (DE); Gerhard Delling, Schmidgaden (DE)

(73) Assignee: GRAMMER AG, Amberg (DE)

( * ) Notice: Subject to any disclaimer, the term of this patent is extended or adjusted under 35 U.S.C. 154(b) by 0 days.

(21) Appl. No.: 14/303,676

(22) Filed: Jun. 13, 2014

(65) Prior Publication Data

US 2014/0368017 A1　Dec. 18, 2014

(30) Foreign Application Priority Data

Jun. 14, 2013　(DE) .......................... 10 2013 009 956

(51) Int. Cl.
*B60N 2/46*　(2006.01)
*A47C 7/54*　(2006.01)

(52) U.S. Cl.
CPC ............ *B60N 2/4606* (2013.01); *B60N 2/4626* (2013.01)

(58) Field of Classification Search
CPC ............................ B60N 2/4606; B60N 2/4626
USPC ............................ 297/411.3, 411.32, 411.38
See application file for complete search history.

(56) References Cited

U.S. PATENT DOCUMENTS

| 5,076,645 | A | 12/1991 | Yokota |
| 5,722,703 | A * | 3/1998 | Iwamoto et al. .................. 292/1 |
| 6,719,358 | B2 | 4/2004 | Schmidt |
| 7,140,688 | B2 * | 11/2006 | Hann ....................... 297/411.32 |
| 7,367,627 | B2 | 5/2008 | Figueras Mitjans |
| 8,070,233 | B2 | 12/2011 | Schumacher |
| 8,967,724 | B2 * | 3/2015 | Battey et al. ......... 297/411.38 X |
| 2003/0052501 | A1 | 3/2003 | Schmidt |
| 2011/0115275 | A1 * | 5/2011 | von Rothkirch et al. 297/411.32 |
| 2014/0159461 | A1 * | 6/2014 | Mochizuki et al. ...... 297/411.32 |

FOREIGN PATENT DOCUMENTS

| DE | 19830027 A | 1/2004 |
| DE | 10302291 A | 8/2004 |
| DE | 102009013461 A | 9/2010 |

* cited by examiner

*Primary Examiner* — Rodney B White
(74) *Attorney, Agent, or Firm* — Andrew Wilford

(57) ABSTRACT

The invention relates to an armrest for a vehicle seat, comprising an armrest body (11) that together with a base (15) forms a pivot joint and can be pivoted through a pivot angle ($\alpha$) between a stowed position and a use position, wherein at least one damper (17a, 17b) is provided to damp the motion of the armrest body (11).
The invention characterized in that the armrest (10) has a control device (18a, 18b) that actuates the damper (17a, 17b) within at least one portion ($\beta$, y) of the pivot angle.

9 Claims, 13 Drawing Sheets

17  18

MOTOR-VEHICLE ARMREST

FIELD OF THE INVENTION

The invention relates to a pivotal armrest for vehicle seats.

BACKGROUND OF THE INVENTION

DE 103 02 291 discloses an armrest that has two pivot arms connecting the armrest to a base body. The armrest has a gas spring element to assist height adjustment and to elastically damp vertical movement of the arrested arm support.

DE 198 30 027 describes an armrest in which predetermined damping characteristics are achieved by a viscous coupling or a piston-cylinder system.

At least one section of the bearing axis is provided in an approach analogous to an elastically twistable torsion bar in the pivotal armrest described in DE 10 2009 013 461. The armrest can be pivoted downward from the self-supporting up position by the torsion of the torsion bar until the bottom of the armrest rests on a contact surface on the seat or on the seat bench.

EP 1 577 152 [U.S. Pat. No. 8,070,233] describes a folding seat whose seat surface and armrest are pivotal. The pivot motion is damped by a damping element.

EP 1 690 474 [U.S. Pat. No. 7,367,627] describes a folding seat with a pivotal seating surface and a pivotal armrest. Pivoting the armrest upward is assisted by a spring.

OBJECT OF THE INVENTION

The object of the invention is to create a pivotal armrest for a vehicle seat, where the armrest does not affect any falling motion associated, for example with noise when pivoted between the use position and the stowed position. The overall motion sequence between the use position and stowed position should be traversed in a controlled manner.

SUMMARY OF THE INVENTION

The armrest has an armrest body that together with a base component forms a pivot joint. The armrest body can thus be pivoted through a pivot angle α between a stowed position and a use position. The armrest has a damper that damps the motion of the armrest body. The damper damps the pivot motion of the armrest body only within a first portion of the pivot angle. The damper is controlled by a control device depending on the position of the armrest body.

A first embodiment is characterized in that the control device has a control cam with a control surface that is in contact with the damper and moves relative to the damper. The cam controls the damper during movement between the stowed position and the use position. The relative motion between the control surface and the damper is controlled, for example, by the movement of the armrest body. The control surface is provided, for example with regions that are more or less raised. The movement of the armrest body is damped or not damped depending on which region the control cam is active.

For example, when the armrest body is moved from the stowed position to the use position, the damping of the damping element is in effect within angular range β, in particular, between 30° and 40°.

Alternatively or additionally, when the armrest body moves from the use position to the stowed position, the damping of the damping element is in effect within a second angular range γ before the stowed position, in particular, within an angular range of between 30° and 40°.

For example, when the armrest body moves from the stowed position to the use position, a resetting device is tensioned that is then released in response to motion from the use position to the stowed position. The resetting force is less than the weight exerted by the armrest body. The resetting force can be, for example half the weight.

The damper is associated with, for example the armrest body or the base component, while the control cam is associated with the other part of the base component or armrest body.

The damper has, for example a cylinder and a piston rod that can be moved between a primary position and a secondary position in a first direction of motion and in a second direction of motion.

The motion of the armrest is damped, for example when the piston rod moves in the first direction of motion, and is not damped when it moves in the second direction of motion.

The control surface is in contact, for example with a roller attached to the piston rod. This approach enables a situation to be avoided whereby transverse forces act on the piston rod that are not directed in the first or the second directions of motion.

The torque (MR) caused by the resetting force and the torque (MG) caused by the weight cancel each other out at one point in the pivot range since over a large part of the pivot range only one component of the weight is in effect for a torque of the armrest while another component is taken up by the pivot joint. MG is greater than MR, and the armrest moves to the use position without being actuated by the user, only when in response to movement from the stowed position to the use position the armrest body moves beyond this point.

Whenever the armrest body moves from the use position to the stowed position, the armrest must be moved by the user beyond this point at which MG and MR are equal. After this the armrest is pivoted by the resetting force to the stowed position.

BRIEF DESCRIPTION OF THE INVENTION

Further aspects of the invention are seen in the illustrated embodiments illustrated schematically in the drawing. Therein:

Figure 8:
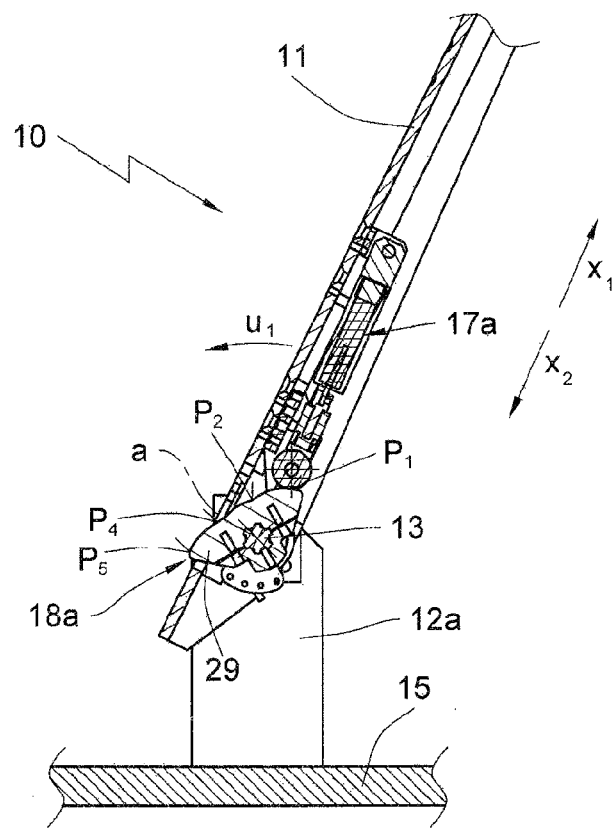
FIG. 8 is the detail shown at VIII in FIG. 7.
Figure 9:
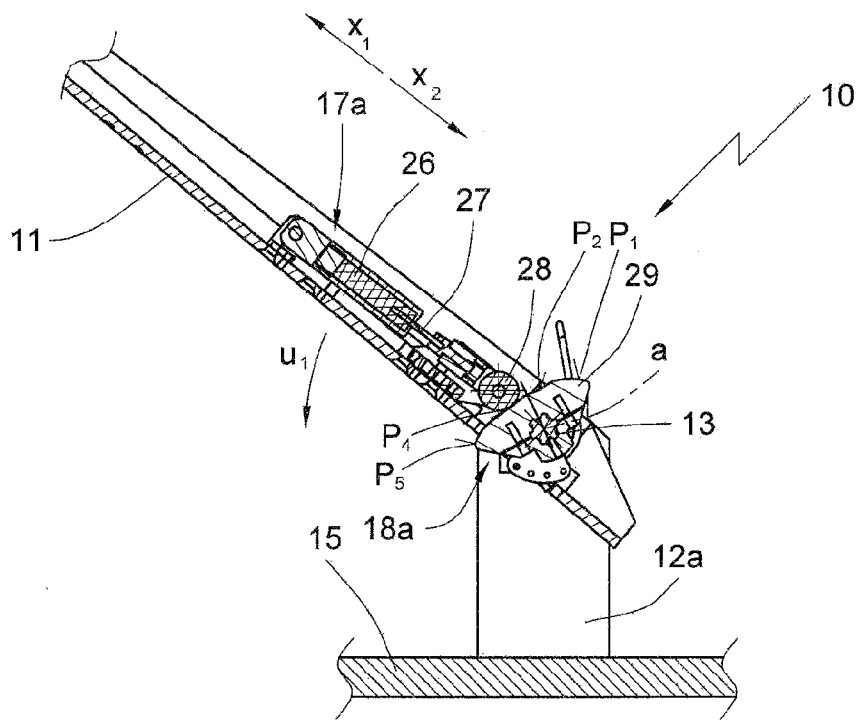
Figure 10:
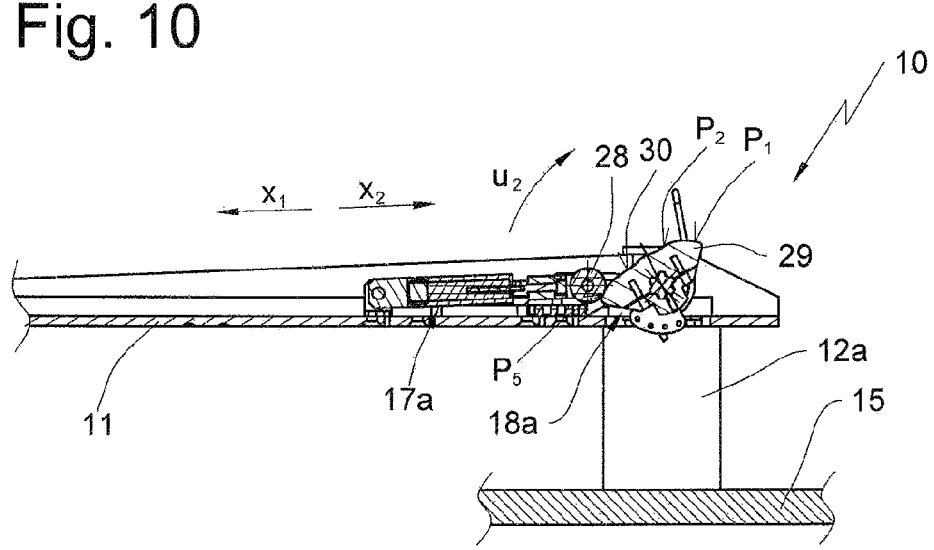
Figure 11:
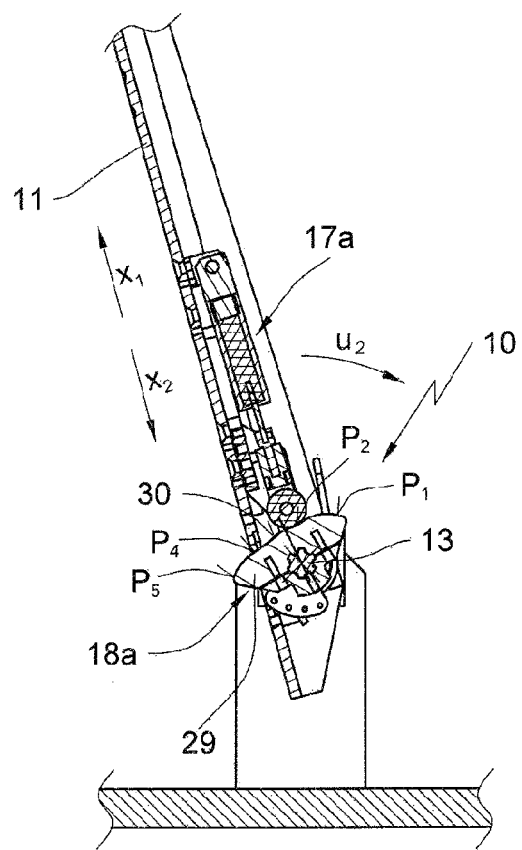
Figure 12:
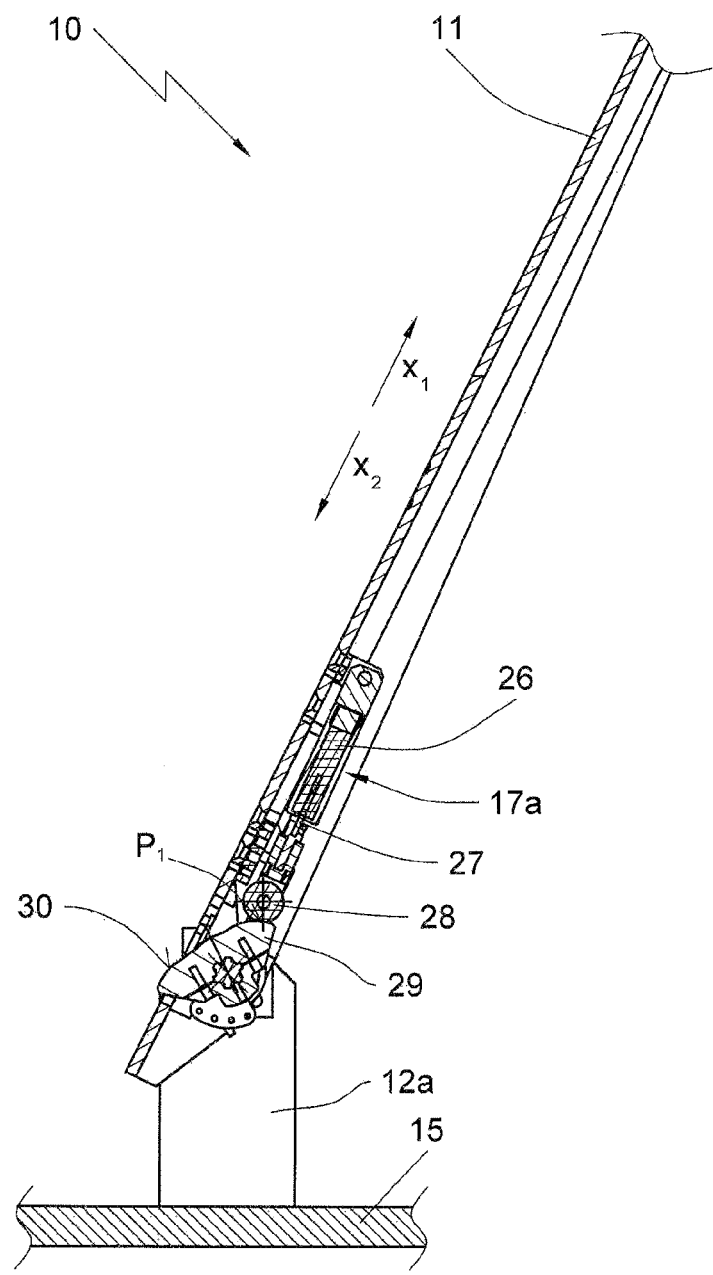

FIG. 9, FIG. 10, FIG. 11, and FIG. 12 are views like FIG. 8 that show the armrest body in different pivot positions.

Figure 13:
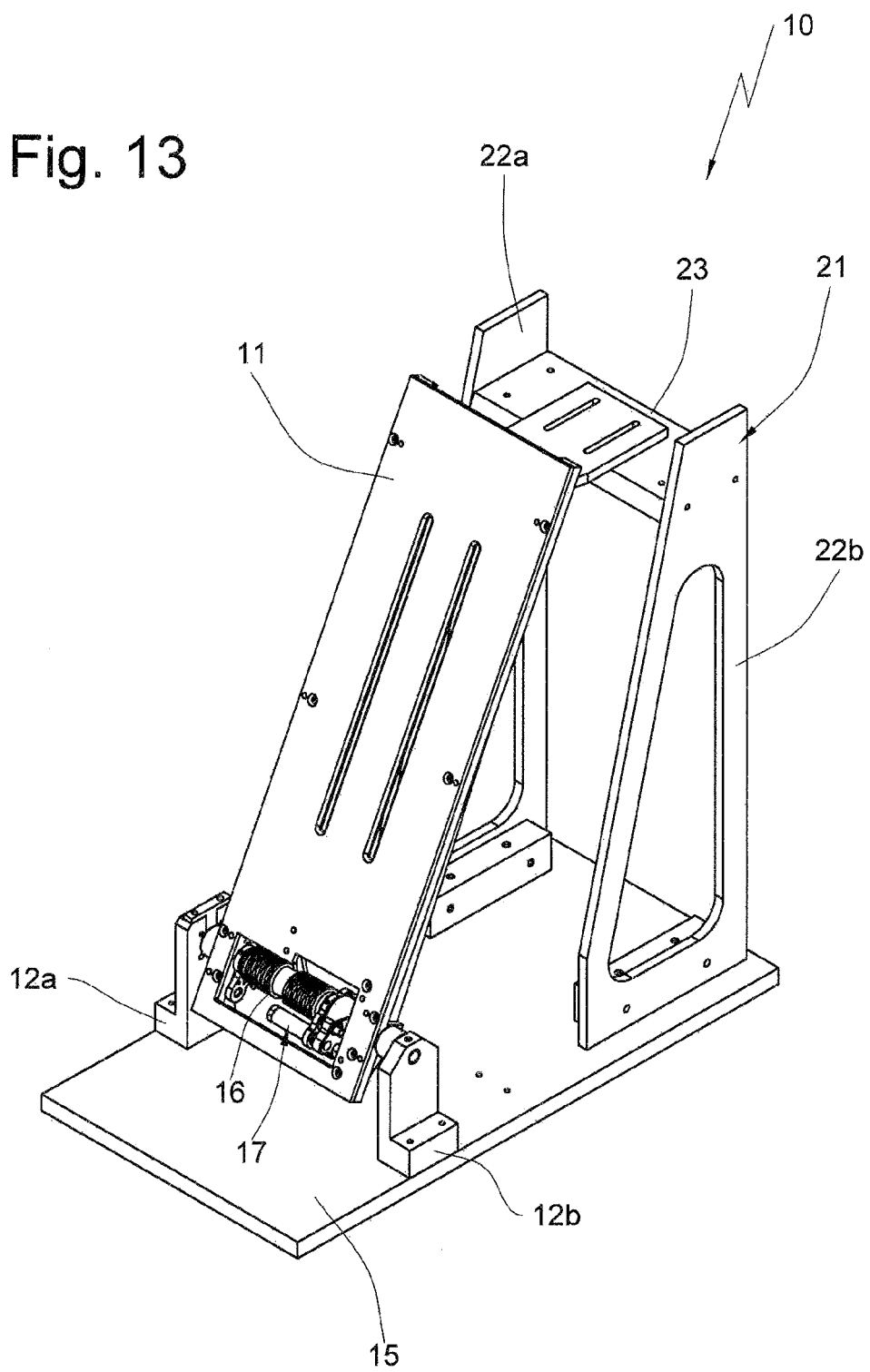

FIG. 13 is a perspective view of a second embodiment of the armrest in the stowed position.

Figure 14:
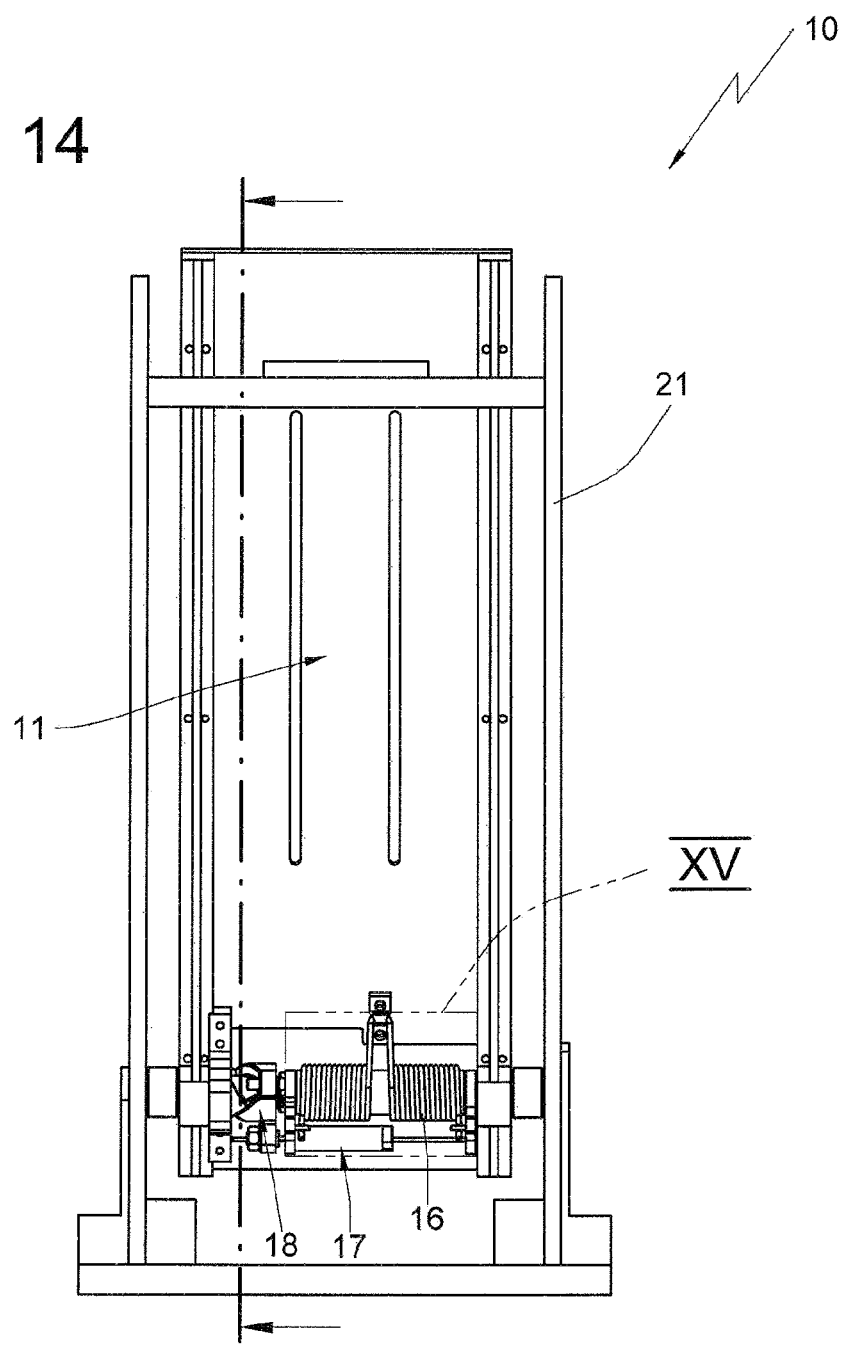

FIG. 14 is a rear view of the armrest in FIG. 13.

Figure 15:
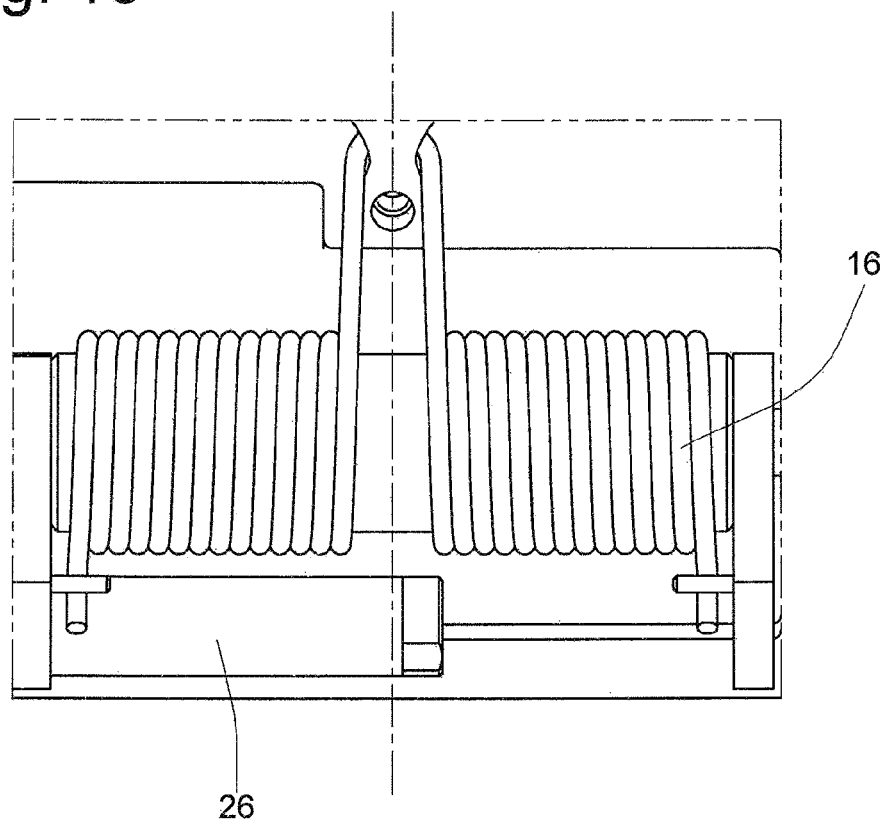

FIG. 15 is the detail shown at XV in FIG. 14.

Figure 16:
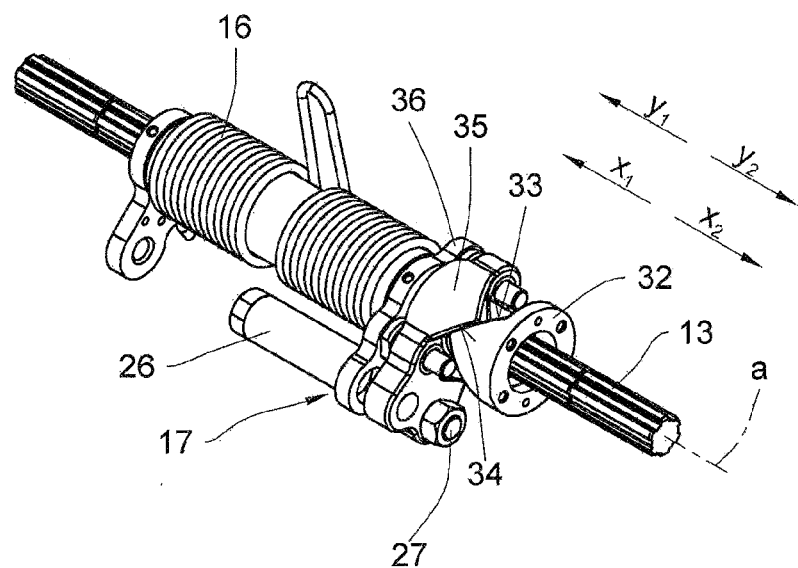

FIG. 16 is a perspective view of the axis/shaft of the damper and of the control device.

Figure 17A:
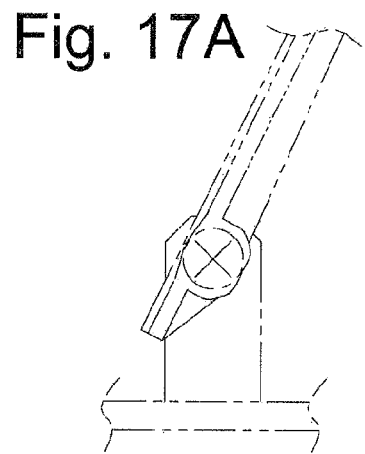

FIG. 17A is a side view of a detail showing the armrest in the stowed position.

Figure 17B:
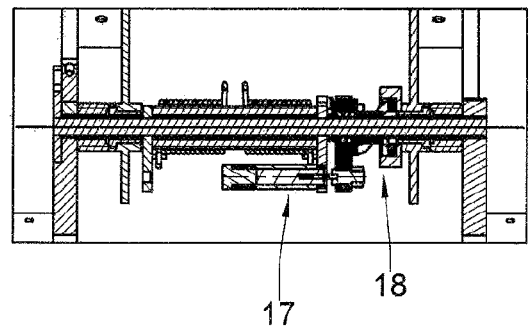
Figure 18A:
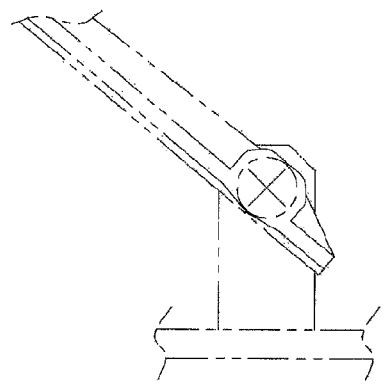
Figure 18B:
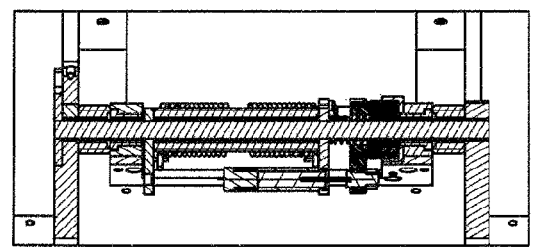
Figure 19A:
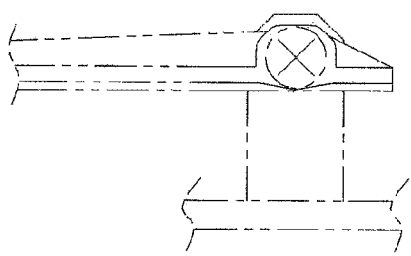
Figure 19B:
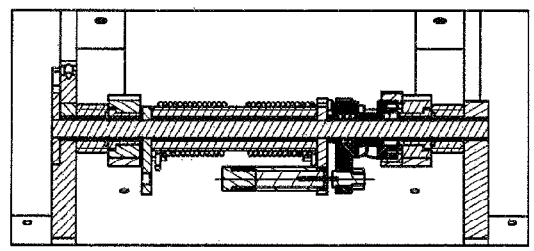
Figure 20A:
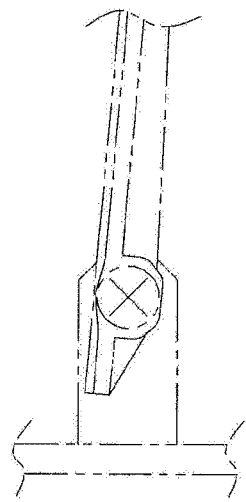
Figure 20B:
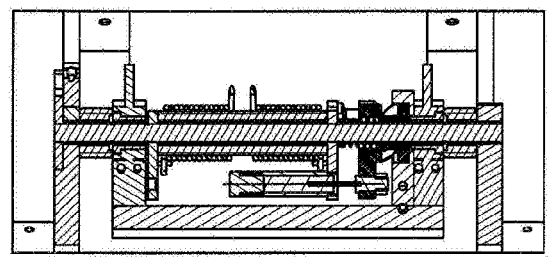
Figure 21A:
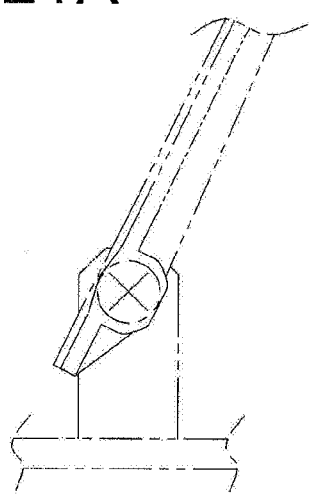
Figure 21B:
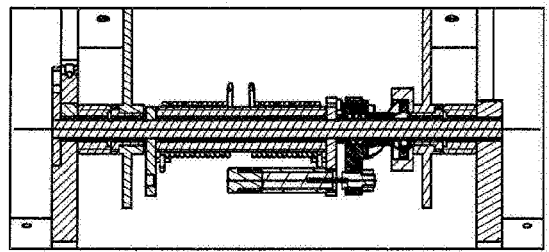

FIG. 17B is a view like FIG. 15 and shows a detail of the control device and the damper in the position shown in FIG. 17A.

FIGS. 18A and 18B, FIGS. 19A and 19B, FIGS. 20A and 20B, and FIGS. 21A and 21B, show various positions of the armrest body, and the corresponding position of the control device and of the damper.

Figure 22:
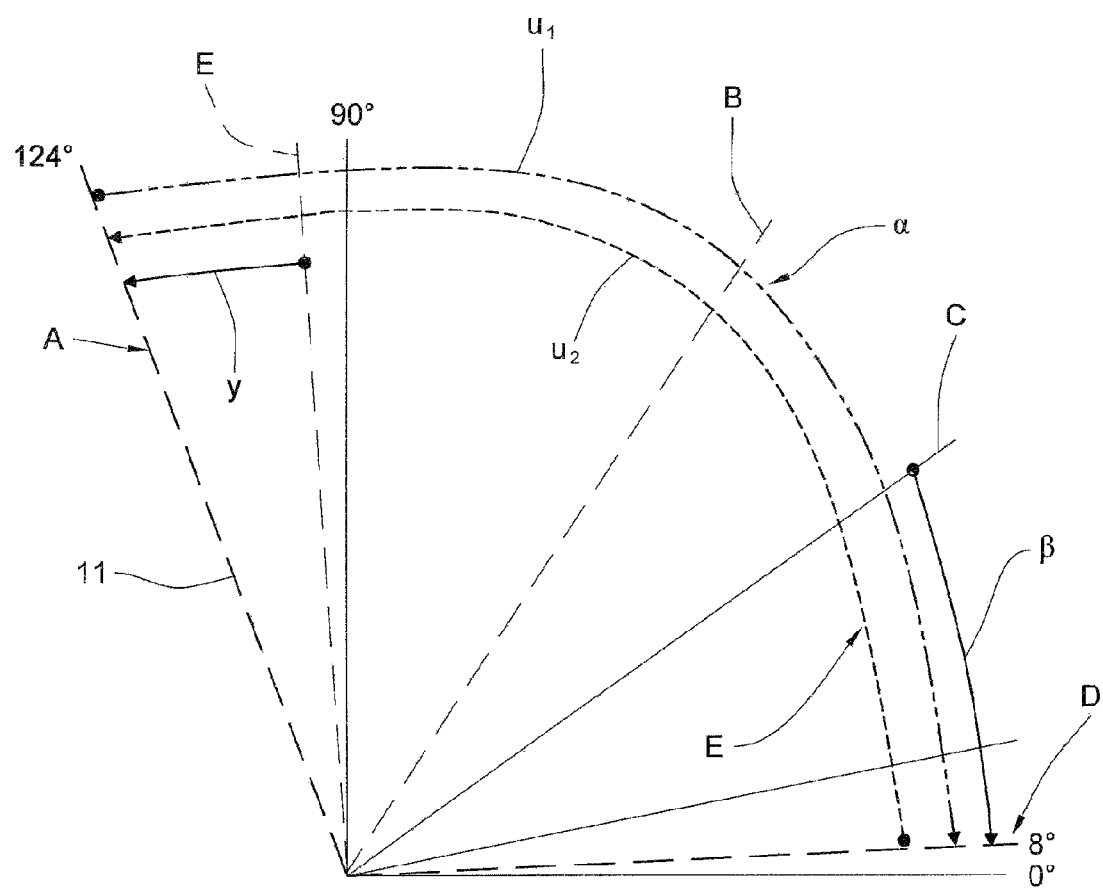

FIG. 22 is a diagram plotting the movement of the armrest body between the stowed position and the use position, and the angular ranges in which damping occurs.

SPECIFIC DESCRIPTION OF THE INVENTION

In all cases an armrest for vehicle seats is identified in the figures by reference numeral 10. Identical reference numerals in the various figures identify identical components regardless of whether lower-case characters are added or omitted.

FIGS. 1 through 12 show a first embodiment of the armrest 10. The armrest 10 in FIG. 1 has an armrest body 11 pivotal on a vehicle-fixed base 15 about an axle or shaft 13 defining a pivot axis a by means of pivots 12a and 12b. The body 11 can be pivoted through a pivot angle α between a use position shown in FIG. 1 and a stowed position shown in FIG. 2. In the use position, the user's arm can bear on an arm support side 19 of the body 11. The body 11 normally carries an unillustrated cushion.

In addition, the armrest 10 has a frame 21 including side walls 22a and 22b that are connected by a crosspiece 23. The frame 21 also carries a stop 24 for the armrest body 11.

The shaft 13 (see, for example FIG. 5) is supported in collars 20 on supports 12a and 12b. The collars 20 are provided with internal splines. The shaft 13 has external splines that mesh with the internal splines of the collars 20. As a result, the shaft 13 cannot rotate relative to the collars 20. The shaft 13 has bearings 31 that are not externally splined. The body 11 is supported on the bearings 31. The body 11 can thus pivot relative to the shaft 13.

A spring 16 biases the body 11 into the stowed position. In addition, a first damper 17a and a second damper 17b are provided to damp movement of the body 11, while a first control device 18a is provided to control the damper 17a and a second control device 18b is provided to control the damper 17b.

Figure 1:
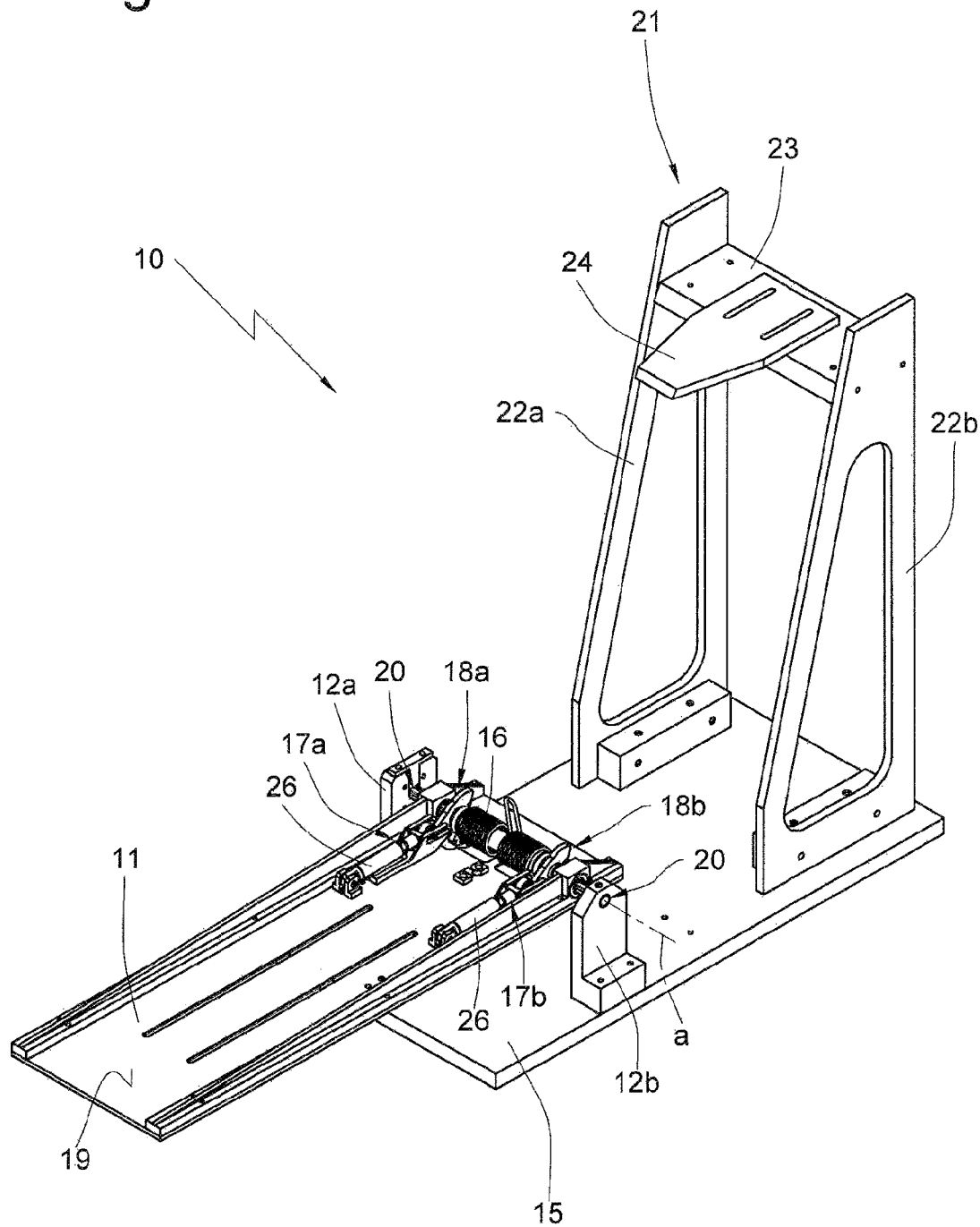
FIG. 1 is a perspective view of a first embodiment of the armrest when in the use position.
Figure 2:
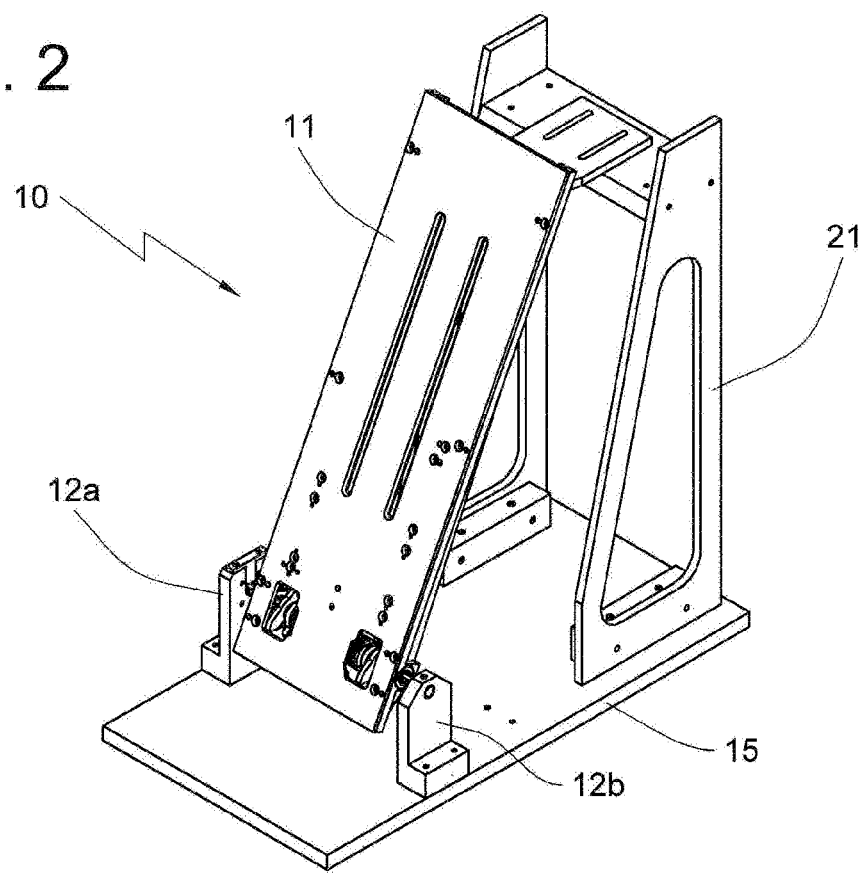
FIG. 2 is a perspective view of the armrest in the stowed position.
Figure 3:
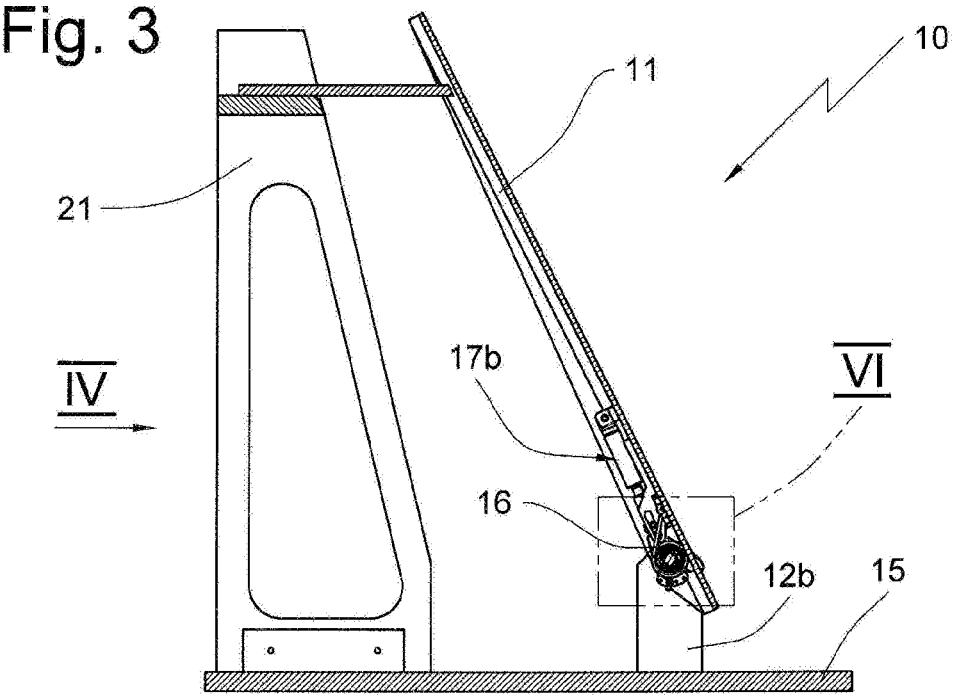
FIG. 3 is a longitudinal section through the armrest.
Figure 4:
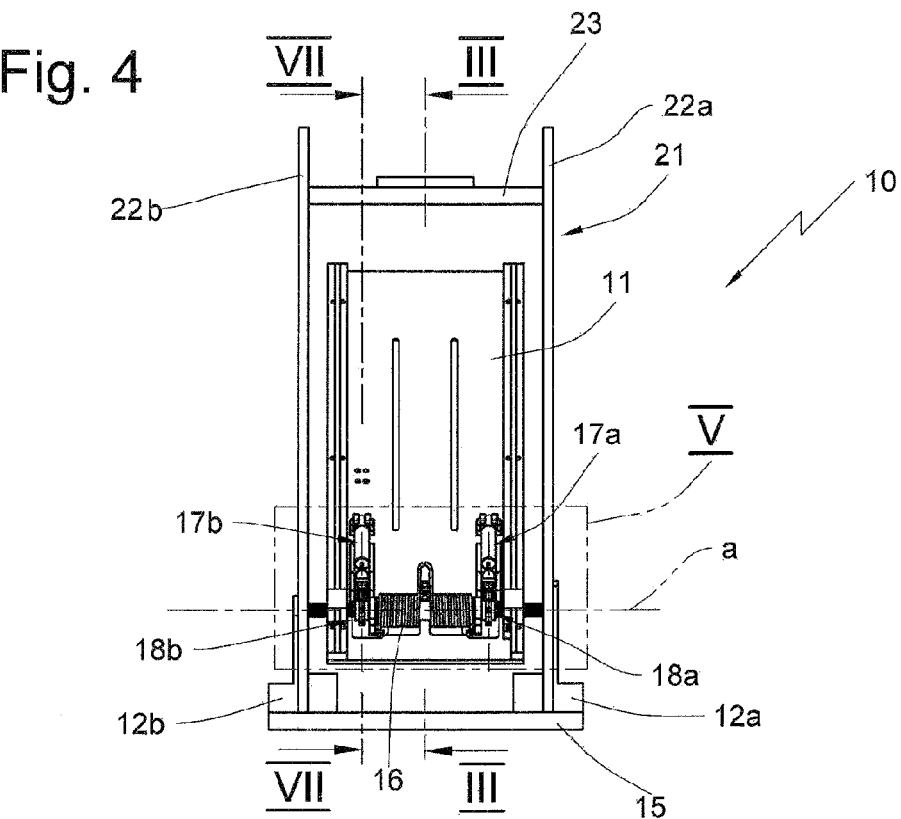
FIG. 4 is a rear view of the armrest as shown by arrow IV in FIG. 3.
Figure 5:
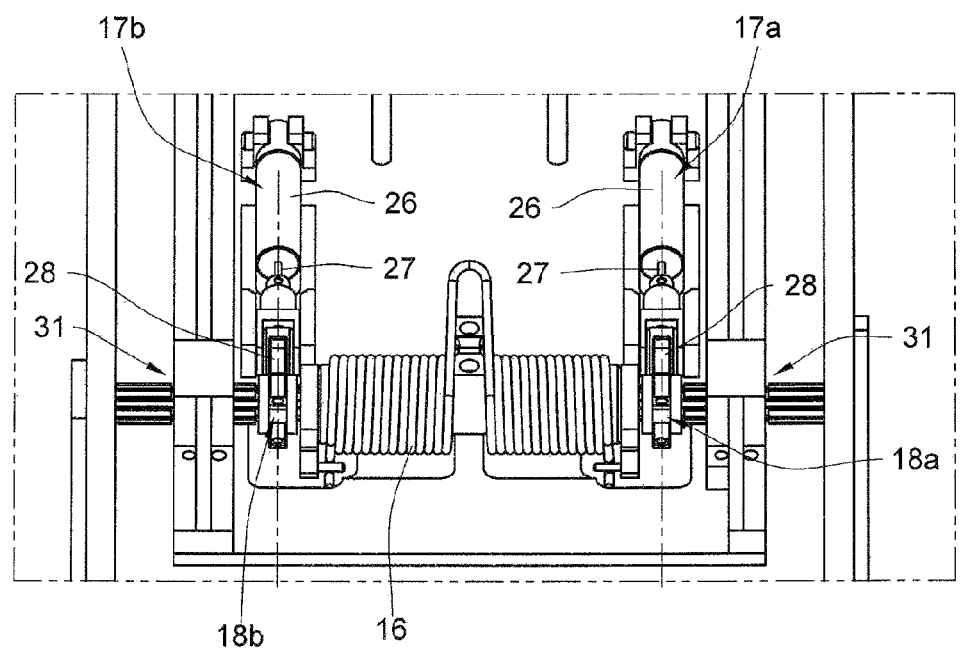
FIG. 5 is the detail shown at V in FIG. 4.
Figure 6:
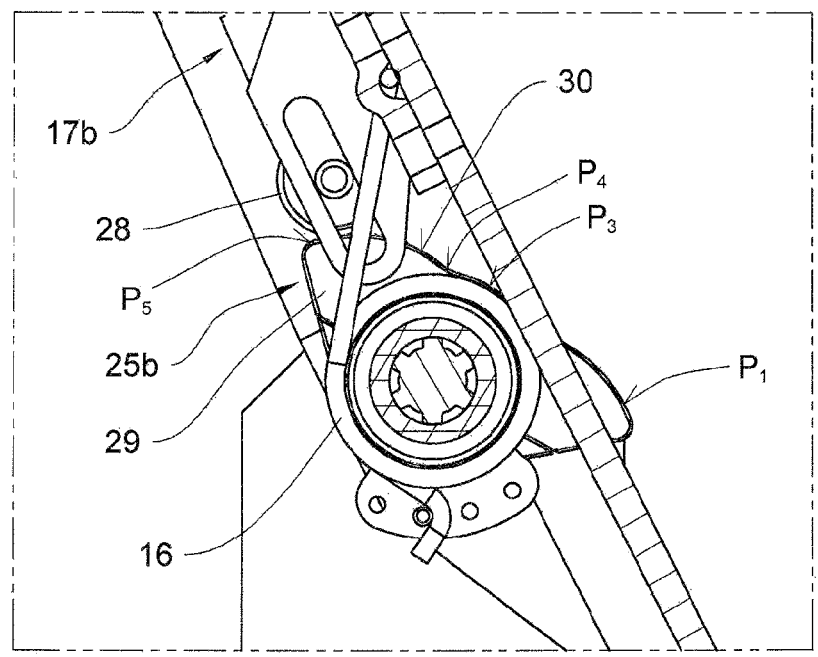
FIG. 6 is the detail shown at VI in FIG. 3.
Figure 7:
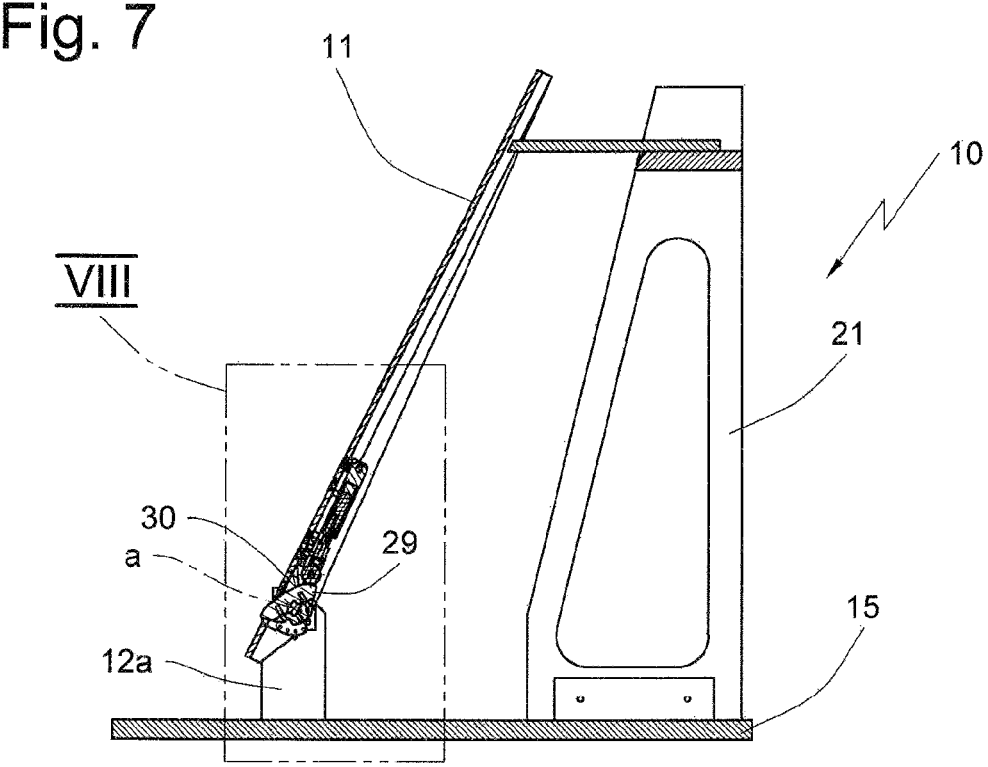
FIG. 7 is a section taken along line VII in FIG. 4.

The dampers 17a and 17b each comprise a cylinder 26 having a piston rod 27 (see, for example FIG. 5). A respective roller 28 is rotatable on the outer end of each piston rod 27. The piston rod 27 can move between an extended primary position in which it projects to the maximum extent out of the cylinder and a retracted secondary position in which it has been moved to the maximum extent into the cylinder, for example in directions of motion $x_1$ (piston rod moves into the cylinder) and $x_2$ (piston rod moves out of the cylinder).

Damping is in effect when piston rod 27 is moved out of the extended position into the cylinder in the retracted position. When piston rod 27 is released, the piston rod is automatically moved by a resetting device, not shown, out of the piston to the extended position. No damping occurs during the resetting motion to the extended position.

The control devices 25a and 25b each include a cam 29 (see for example FIG. 6) having a control surface 30. The cam 29 is supported on the shaft 13 and is provided with internal spines that engage external splines of the shaft 13. The cam 29 thus is rotationally fixed to the shaft 13. The control surface 30 has regions that are at different spacings from the shaft axis a. $P_2$, for example is a shorter spacings from the shaft axis a than point $P_3$ and point $P_4$. Point $P_3$ in turn is a shorter spacing from the shaft axis a than point $P_5$.

Since the cylinder 26 is attached to the body 11 at a fixed spacing from the shaft axis a, the piston rod 27 is thus moved that much farther toward the retracted position the greater the spacing is for the region of the control surface 30 that is in contact with the roller 28. Whenever the roller 28 for example is in contact with point $P_3$, the piston rod 27 is in the extended position. Whenever the roller 28 for example is in contact with point $P_5$, the piston rod 27 is in the retracted position.

The motion sequence of the body 11 from the stowed position to the use position and back to the stowed position is showed in FIGS. 8 through 12 and the diagram of FIG. 22. The body 11 in FIG. 22 is shown only by a broken line. When in the stowed position, the body 11 has been pivoted, for example 124° relative to the horizontal position.

When the body 11 is pivoted in a direction $u_1$ from the stowed position (see FIGS. 7 and 8, and reference A in FIG. 22), the body 11 must first be moved against the spring torque MF of spring 16. When the body 11 is moved beyond the position (see reference B in FIG. 22) in which the torque MG resulting from the weight of the body 11 cancels out the opposing spring torque MF, the body 11 continues to pivot in the direction $u_1$ without being actuated by the user since MG is now greater than MF.

The damping of the motion of the body 11 begins when that position has been reached (see FIG. 9, reference C in FIG. 22, and also FIG. 6, reference $P_2$) in which the roller 28 comes into contact with the point $P_2$ of the control surface 30. This is because the control surface 30 is at an increasing spacing from the shaft axis a between $P_2$ and $P_5$. This is the situation, for example within the angular range β, approximately 30° to 40° before reaching the use position. The starting point for damping, however, can be flexibly configured by modifying the control cam.

The body 11 then moves at a damped speed in the direction $u_1$ to the use position identified by reference D in FIG. 22. In the use position (see FIG. 10), the body 11 has been pivoted for example 8° relative to the horizontal position.

From the use position, the body 11 is pivoted in a direction $u_2$ to the stowed position. The user here does not have to apply the entire torque MG since the motion in direction $u_2$ is assisted by torque MF that acts in the direction $u_2$. Since the control cam now has the roller 28 moving over it in the opposite direction, the piston rod 27—actuated by the resetting device—moves out of the cylinder 28. The return motion of the body 11 is not damped.

Whenever the body 11 is moved in the direction $u_2$ beyond the metastable position in which MF and MG cancel each other out (see reference B in FIG. 22), the body 11 continues to move in the direction $u_2$ without being actuated by the user. Once the body 11 has reached an angular position of approximately 85° to 95° (see reference E in FIG. 22 and FIG. 11), the roller 28, in response to the continued pivot motion in the direction $u_2$, comes into contact with the point $P_4$ of the control cam at which the spacing from the shaft axis a once again increases. In other words, the piston rod that is in the extended position shown in FIG. 11 again moves toward the retracted position while further motion of the armrest is damped within angular region γ.

The roller 28 is in contact with the point $P_5$ of the control surface 30 in the stowed position of FIG. 8. The piston rod 27 is in the retracted position.

FIGS. 13 through 21b show a second embodiment of the armrest 10 which fundamentally corresponds to the first embodiment, but, however, unlike in the first embodiment the control surface is associated with the body 11, while the cylinders 26 are fixed to the shaft 13. FIG. 16 shows a control cam 32 that is attached in a fixed fashion to the body 11. The control cam 32 has a control surface 33 that interacts with an actuation surface of an actuating element 35. The actuating element 35 can move in directions $y_1$ and y2. Directions of motion $y_1$ and $y_2$ are parallel to the shaft axis a and to directions $x_1$ and $x_2$ of the piston rod 27. The cylinder 26 of the damper 17 is supported in a bearing element 36 that is fixed to the shaft 13. The piston rod 27 is attached to the actuating element. The farther the control surface 33 projects in the direction $x_1$, the farther the actuating element 35, and thus piston rod 27, are moved from the extended position toward the retracted position.

The invention claimed is:

1. An armrest for a vehicle seat, the armrest comprising:
an armrest body;
a base that forms with the body a pivot joint for pivoting of the armrest relative to the body through a pivot angle between a stowed position and a use position;
at least one damper that damps pivoting of the armrest body; and
a control device that actuates the damper within at least a first portion of the pivot angle, the control device having a control cam including a control surface that is in operative contact with the damper and moves relative to the damper.

2. The armrest according to claim 1, wherein the damping by the damper is effective only within a first angular range before the use position within an angular range of between 30° and 40° before the use position when the armrest body moves from the stowed position to the use position.

3. The armrest according to claim 1, wherein the damping by the damper is in effective only within a second angular range before the stowed position within an angular range of between 30° and 40° before the stowed position when the armrest body moves from the use position to the stowed position.

4. The armrest according to claim 1, further comprising:
a resetting spring tensioned when the armrest body moves from the stowed position to the use position and released in response to the movement from the use position to the stowed position.

5. The armrest according to claim 1, wherein the damper is connected with the armrest body or the base component, and the control cam is connected with the respective other part of the base component or the armrest body.

6. The armrest according to claim 1, wherein the damper has a cylinder and a piston rod, the piston rod being movable in a first direction of motion and a second direction of motion between an extended position and a retracted position.

7. The armrest according to claim 6, wherein pivoting of the armrest body is damped when the piston rod moves in the first direction of motion and is not damped in response to movement in the second direction of motion.

8. The armrest according to claim 6, wherein the control surface is in contact with a roller carried by the piston rod.

9. An armrest for a vehicle seat, the armrest comprising:
an armrest body;
a base that forms with the body a pivot joint for pivoting of the armrest relative to the body through a pivot angle between a stowed end position and a use end position;
at least one damper that damps pivoting of the armrest body;
a control device that actuates the damper within at least a first portion of the pivot angle, the control device having a control cam including a control surface that is in contact with the damper and moves relative to the damper; and
a spring braced between the body and the base and biasing the base during its entire travel from the use end position into the stowed end position.

* * * * *